United States Patent [19]

Schurr et al.

[11] Patent Number: 5,711,395
[45] Date of Patent: Jan. 27, 1998

[54] ROTARY SLIDE VALVE FOR POWER-ASSISTED STEERING MECHANISMS OF MOTOR VEHICLES

[75] Inventors: Rudolf Schurr, Aalen; Gunther Breu, Iggingen, both of Germany

[73] Assignee: ZF Friedrichshafen AG, Friedrichshafen, Germany

[21] Appl. No.: 545,795
[22] PCT Filed: May 10, 1994
[86] PCT No.: PCT/EP94/01510
§ 371 Date: Jan. 17, 1996
§ 102(e) Date: Jan. 17, 1996
[87] PCT Pub. No.: WO94/26574
PCT Pub. Date: Nov. 24, 1994

[30] Foreign Application Priority Data

May 13, 1993 [DE] Germany ............... 43 16 005.0

[51] Int. Cl.[6] ............................................. B62D 5/08
[52] U.S. Cl. ................................ 180/441; 180/417; 91/375 A
[58] Field of Search ................................. 180/417, 421, 180/422, 423, 426, 427, 441; 91/375 A

[56] References Cited

U.S. PATENT DOCUMENTS 5,147,009  9/1992  Chikuma et al. ............... 91/375 A X
5,241,893  9/1993  Guasch et al. .................. 180/441 X
5,396,969  3/1995  Joerg et al. ..................... 180/441 X Primary Examiner—Kevin Hurley
Attorney, Agent, or Firm—Larson & Taylor

[57] ABSTRACT

A rotary slide valve for power-assisted steering mechanisms of motor vehicles has two valve elements (1, 2) which are arranged to be coaxially movable within each other and are connected with each other via a torsion rod (7) and a backlash coupling (8) in such a way that they are rotatable around each other by maximally the pivot path of the backlash coupling. The inner valve element (1) is connected with a valve inlet member (3) and the outer valve element (2) with a valve outlet member (4), fixed against relative rotation. The one part of the backlash coupling (8) is formed on the radially inner valve element (1) by claws (10) which project in relation to its front face in the axial direction. The other part of the backlash coupling (8) is constituted by two pins (11) which are disposed parallel with each other in the radially outer valve element (2), whose axes (12) are located in a plane (13) extending perpendicularly in respect to the axis (14) of the rotary slide valve. The axes (12) of the pins (11) are arranged symmetrically with each other in respect to the axis (14) of the rotary slide valve. The backlash coupling and control path limitation realized by means of this rotary sliding valve can be produced with simple means.

3 Claims, 1 Drawing Sheet

ROTARY SLIDE VALVE FOR POWER-ASSISTED STEERING MECHANISMS OF MOTOR VEHICLES

BACKGROUND OF THE INVENTION

1. Field of the Invention

The invention relates to a rotary slide valve for power-assisted steering mechanisms of motor vehicles. The rotary slide valve contains two valve elements—namely a rotary slide and a valve sleeve—, which are arranged coaxially movable within each other and are connected with each other via a torsion rod and a backlash coupling in such a way that they are rotatable around each other by maximally the pivot path of the backlash coupling. The one valve element is connected with a valve inlet element member and the other valve element with a valve outlet member, fixed against relative rotation. A part of the backlash coupling is formed on the radially inner valve element by claws which project in relation to the front face of the valve element.

2. Description of the Prior Art

Such a rotary slide valve is known, for example, from DE-OS 17 55 438. In this rotary slide valve the inner and the outer valve elements are provided with stops or claws in case the torsion rod should break or the hydraulic installation should fail. These stops and claws come into play if one of the mentioned defects occurs. In such a case the steering gear can continue to be manually operated.

With normal steering movements the stops and claws, which together constitute the backlash coupling, limit the control path of the rotary slide valve, so that oversteering is not possible. In addition, the movement of the torsion rod is limited to its proportional range.

With the arrangement proposed in DE-OS 17 55 438, however, the claws which cooperate with the stops of the outer valve element are disposed approximately in the center of the valve element constituting the rotary slide. But it is only possible to produce a component with radially projecting claws arranged in this way by means of a considerable outlay of material and production effort.

In another known rotary slide valve (DE-C2-33 03 063) the claws project from the rotary slide in the axial direction in relation to its front face. Such claws can be produced relatively simply. But the openings of the outer valve element, which are provided with parallel lateral walls, are more difficult to produce. Relatively expensive broaching tools are required for this.

In addition, with this rotary slide valve there is an open connection through the broached openings of the outer valve element between its inner chamber and the exterior environment. Therefore the use of such a rotary slide valve is limited to structures in which the same pressure is present at this point inside and outside of the outer valve element and therefore no connection with different cylinder chambers is permitted. If this were the case, a great effort would be required to close and seal the broached openings from both sides.

The object of the invention lies in designing a rotary slide valve in such a way that the disadvantages of the known designs are avoided. It is intended in particular to produce the backlash coupling by simple means. It is intended to employ the rotary slide valve in many ways, without an additional outlay, particularly in respect to additional sealing steps.

SUMMARY OF THE INVENTION

This object is attained by the rotary slide valve of the present invention. Further advantageous and practical embodiments of the invention are described herein. The attainment of the object consists in particular in that the other part of the backlash coupling is constituted by two pins which are disposed parallel with each other in the radially outer valve element, whose axes are located in a plane extending perpendicularly in respect to the axis of the rotary slide valve. The bores for the pins can be produced particularly simply if the axes of the pins lie symmetrically with each other in respect to the axis of the rotary slide valve. In this case the pins can also be automatically mounted. The pins can be pressed oil-proof into the outer valve element in a simple manner by an appropriate selection of the fit between the pins and the bores. This results in the advantage that the pressed-in pins are used for limiting the steering movement (backlash coupling), as well as for a seal between the inner chamber and the outside of the valve elements. No additional sealing is required. In this way the interior and exterior areas of the valves can be assigned to different pressure chambers. Since the outsides of the pins are charged with respectively the same pressure, no additional safety against displacement is required. If the distance of the axis of each pin from the adjoining wall of the central bore of the outer valve element is selected to be less than half the diameter of the pin, the pins can be supported over their entire length on at least one side in the direction of the stress. Therefore the pins are not placed under a bending strain.

In a particularly advantageous embodiment the outer valve element is formed of one piece with the valve outlet member. In this case the outer valve element is the control sleeve of the rotary slide valve. Depending on the type of steering, the valve outlet member can be a driving pinion or a ball screw spindle.

The invention is not limited to the disclosed combination of characteristics. Further useful combination options and characteristics ensue for one skilled in the art from the object of the invention.

The invention will be described in detail below by means of an exemplary embodiment represented in the drawings.

BRIEF DESCRIPTION OF THE DRAWINGS

Shown are in.

DETAILED DESCRIPTION OF THE PREFERRED EMBODIMENTS

Figure 1:
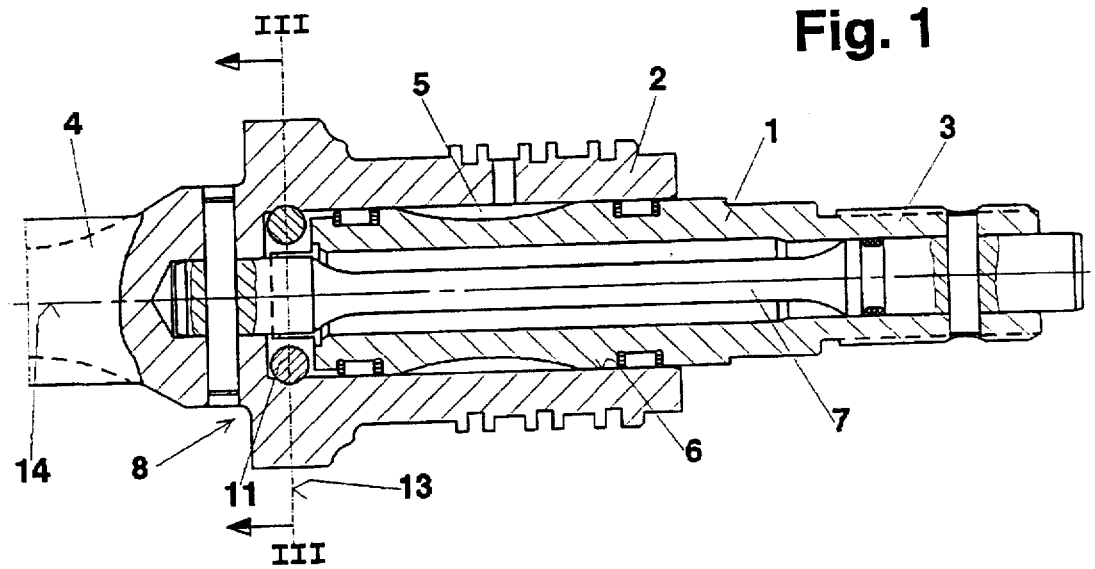
FIG. 1, a longitudinal sectional view of the rotary slide valve in accordance with the invention.
Figure 2:
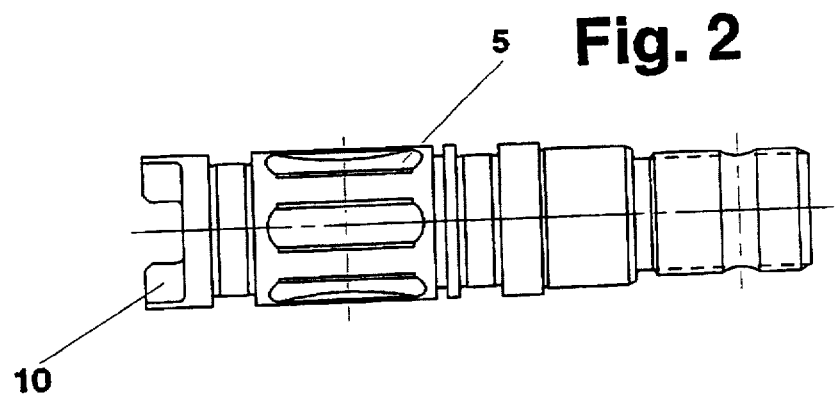
FIG. 2, a rotary slide in a front view.
Figure 3:
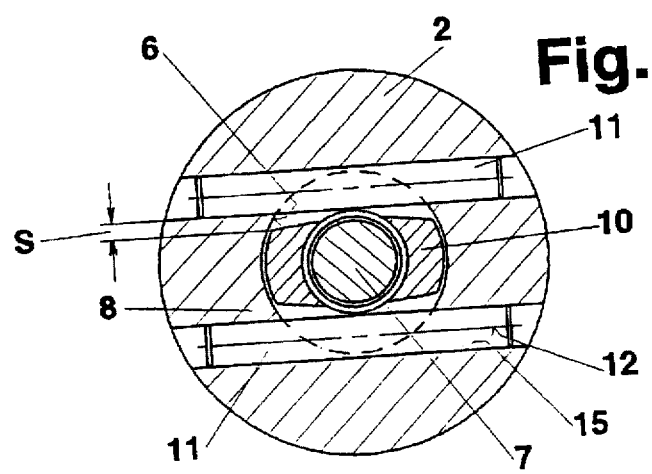
FIG. 3, a cross sectional view on an enlarged scale of the rotary slide valve along the line III—III of FIG. 1.

The rotary slide valve in accordance with the invention has two valve elements, namely an inner valve element 1 in the form of a rotary slide and an outer valve element 2 in the form of a valve sleeve. The inner valve element 1 is connected, fixed against relative rotation, with a valve inlet member 3, the outer valve element 2 with a valve outlet member 4. The valve outlet member can be embodied as a pinion or a ball screw spindle depending on whether the rotary slide valve is intended to be used in toothed rack or ball nut steering systems. Longitudinal control grooves 5 are disposed on the exterior surface of the inner valve element 1, which cooperate in a known manner with longitudinal control grooves, not shown, disposed in an axial bore 6 of the outer valve element 2.

The two valve elements 1 and 2 are connected with each other via a torsion rod 7 and a backlash coupling 8 in such a way that they are rotatable around each other by maximally the pivot path of the backlash coupling 8. A part of the backlash coupling 8 is disposed in the shape of claws 10 on the inner valve element 1. The claws 10 project in the axial direction in relation to the front face of the inner valve element 1.

The other part of the backlash coupling 8 is formed by two pins 11 fastened in the outer valve element 2. The two pins 11 are disposed parallel with each other. Their axes 12 are located in a plane 13 extending perpendicularly in respect to the axis 14 of the rotary slide valve. The axes 12 of the pins 11 lie symmetrically with each other in respect to the axis 14 of the rotary slide valve.

The pins 11 have been pressed into bores 15 of the outer valve element 2. In this case the pins 11 pass through the axial bore 6 of the outer valve element 2. Since the pins 11 are mounted with press fit, there is an oil-proof seal between the inner chamber of the axial bore 6 and the exterior environment at the outer valve element 2.

The distance of the axis 12 of each pin 11 from the adjoining wall of the axial bore 6 of the outer valve element 2 is less than half the diameter of the pin 11 such that each pin 11 is supported on the side away from the axis 14 of the rotary slide valve in a mating recess in the adjoining wall of the axial bore 6 of the outer valve element 2. Therefore each pin is also supported on the wall of the bore 15 over its center area on its side which lies radially outward in respect to the axis 14 of the rotary slide valve. Therefore it is not placed under a bending strain. The dimensions and the association of the claws 10 with the pins 11 take place in such a way that the claws 10 project with a defined pivot play S perpendicular to the axis of the rotary slide valve into the space between the two pins 11. The hydraulic oil control by means of the rotary slide valve takes place within the limits of this pivot path in a known manner. The claws 10 rest on the pins 11 after overcoming the pivot path S. This provides a steering limit movement in a simple way. By means of the claws 10 resting against the pins 11, the outer valve element 2 is taken along mechanically by the inner valve element 1, i.e. the backlash coupling 8 is "closed".

In the exemplary embodiment described up to now, the inner valve element 1 is fixedly connected with the valve inlet member 3. The outer valve element 2 is made of one piece with the valve outlet member 4. However, the invention can be realized with the same advantages with the valve elements associated with each other in the opposite manner. In that case the outer valve element would be connected with the valve inlet member and the inner valve element with the valve outlet member in a manner fixed against relative rotation.

We claim:

1. A rotary slide valve having an axis for power-assisted steering mechanisms of motor vehicles which comprises:

a rotary slide and a valve sleeve arranged coaxially to permit movement relative to one another, the rotary slide being connected to the valve sleeve by a torsion rod which includes a backlash coupling having a pivot path, in such a way that the rotary slide and valve sleeve are rotatable about each other by maximally the distance of the pivot path of the backlash coupling;

a valve inlet member connected to the rotary slide;

a valve outlet member connected to the valve sleeve;

and wherein a part of the backlash coupling is formed on the rotary slide by claws which project, perpendicular to the axis of the rotary slide valve with the remaining part of the backlash coupling being formed by two pins which are disposed parallel to one another in the valve sleeve and which have axes that are located in a plane extending perpendicular to the axis of the rotary slide valve, and the two pins are sealed with an oil-proof seal into the valve sleeve.

2. A rotary slide valve in accordance with claim 1 wherein the rotary slide valve further comprises an outer valve element and, each pin is supported on the side away from a central axis of the rotary slide valve in a mating recess in the adjoining wall of the axial bore of the outer valve element.

3. A rotary slide valve in accordance with claim 2, characterized in that the outer valve element is formed as one piece with the valve outlet member.

* * * * *